UNITED STATES PATENT OFFICE.

JOHN R. MARDICK, OF NEW YORK, N. Y.

PROCESS OF MANUFACTURING ALUMINUM CHLORID.

1,325,203.           Specification of Letters Patent.      Patented Dec. 16, 1919.

No Drawing.        Application filed March 12, 1919.   Serial No. 282,174.

*To all whom it may concern:*

Be it known that I, JOHN R. MARDICK, a citizen of the United States, and resident of the borough of Manhattan, in the city, county, and State of New York, have invented a new and useful Process of Manufacturing Aluminum Chlorid, of which the following is a specification.

My invention relates to aluminum chlorid and more particularly to the manufacture of anhydrous aluminum chlorid.

The principal object of the invention is to provide a simple and inexpensive method of producing anhydrous aluminum chlorid in quantity and in comparatively pure commercial form. A further object is the recovery of calcium sulfate. Generally stated, this is accomplished in the preferred mode of carrying out the invention by reaction under the application of heat between an aluminum compound or compounds, for example, such as alumina or bauxite ore, calcium oxid, carbon bisulfid and dry chlorin gas, the carbon bisulfid acting as a reducing agent facilitating the combination of the chlorin with the aluminum to form aluminum chlorid, which sublimes and is collected in suitable cooling chambers. The calcium oxid combines with the $SO_2$, which would otherwise pass off with the flue gases and be likely to constitute a nuisance, and the process can be conducted with a view to recovering the calcium sulfate which remains behind.

My invention is hereby described according to the preferred manner of performing the same and is more particularly defined and pointed out in the appended claims.

According to the preferred manner of practising the invention, I make a mixture of finely divided alumina or bauxite, water free, and dry calcium oxid, preferably in the approximate proportions of one part CaO to four parts $Al_2O_3$, by weight, which mixture may be made in any suitable manner, as, for example, by grinding, crushing, or otherwise pulverizing the alumina or bauxite, and then mixing it with the calcium oxid, or by crushing and grinding the alumina and calcium compound together. I then pass through these oxids of aluminum and calcium a mixture of carbon bisulfid and chlorin gases, at a high temperature, the chlorin being of a purity from 60 per cent. up, preferably 90 per cent. to 95 per cent.

It is desirable to render this mixture more porous in order to produce the desired reactions on the application of heat, and this can be accomplished in a suitable manner by mixing an inert substance, preferably sand, with the mixture, the sand constituting about 20 per cent. of the total mixture, whereupon the porous mixture is subjected to heat in any suitable manner as by placing the mixture into a suitable revolving or stationary furnace and applying heat with natural gases or by other suitable means. At a dull red heat the carbon bisulfid and chlorin gases are passed through this mixture under pressure and reactions take place with the production of aluminum chlorid, which is easily sublimed and is recovered in cooling chambers, leaving behind a residue comprised mostly of calcium sulfate which is produced by the combination of $SO_2$ and calcium oxid in the strongly oxidizing atmosphere of chlorin, in the presence of air which is not excluded from the furnace, while CO or $CO_2$ passes out through the flue of the furnace.

Instead of adding sand to the finely divided mixture of aluminum and calcium compounds as just described, to render the mixture more porous, I may substitute for such sand a suitable fuel added directly to the mixture, such, for example, as crushed or pulverized coke, or I may use coke and sand and burn the coke thus mixed, thus deriving part of the heat for the reaction in this way. When the mixture has attained a suitable temperature, the gases are introduced. Again, I may utilize a suitable combustible binding material, such, for example, as hard tar pitch, tar asphalt, residues from refining processes, preferably petroleum tar coke, with or without crushed or pulverized coke, and, with suitable application of heat, make bricks of this mixture at high pressures. These bricks may then be removed to a suitable furnace, such as a vertical stationary furnace, where, under the application of heat, most of the fuel and binding material is burned off and the porous mixture of aluminum and calcium compounds remains behind. At a suitable temperature I then introduce the mixture of carbon bisulfid and chlorin gases under pressure. The pressure upon the gases may be in the neighborhood of five to ten pounds, and will be varied depending upon conditions of porosity, etc., and in accordance with the observed character of the gases passing from the furnace.

The chlorin gas does not easily attack the alumina without a suitable reducing agent. I find that $CS_2$ serves this purpose very well, because both carbon and sulfur reduce alumina, forming $CO_2$ and $SO_2$ gases. $SO_2$ unites with calcium oxid, while $CO_2$ goes off. The chlorin gas at a dull red heat unites with the aluminum and forms aluminum chlorid, which sublimes at once and is collected in the manner mentioned above.

In the case of pure refined bauxite or alumina which contains only oxid of aluminum, I may not use more than enough oxid of calcium to combine with the sulfur compounds of oxygen produced in the reaction and thus obtain commercially pure calcium sulfate, which may thus be another object of my invention; this calcium sulfate being a valuable residue derived from carrying out the process if the raw materials utilized are sufficiently pure.

The furnace is provided with suitable flues and openings for the eduction of water and ferric chlorid vapors that may be present in the raw material, or may be formed during the process. They will be driven off at a much lower temperature than aluminum chlorid, and I therefore regulate the flues in such a way that at the right moment I admit the vapors to the cooling chambers and collect aluminum chlorid free from moisture and ferric chlorid.

In case the above-described removal of iron as ferric chlorid has not been complete, I prefer to resublime the aluminum chlorid and thereby obtain a very much purer aluminum chlorid with but a slight yellow tinge.

I find that carbon bisulfid and chlorin gases work effectively on the aluminum compound if they are mixed together previously to introducing the same to the aluminum and calcium oxids, in the proportion of one part calcium bisulfid and five parts chlorin, by volume. This mixture can be brought about in any suitable manner, for example, by first vaporizing the carbon bisulfid, and passing the same and the chlorin gas through conduits whereby they are brought together and their proportions regulated before they are injected into the furnace.

My invention is not to be confined to the employment of any definite temperatures at which decomposition of the mixture of oxids of alumina and calcium will take place. The disintegration of the oxid will go on, beginning at about 750° C. and increases gradually with the rise of temperature and up to about 1200° C. The intensity of the reactions depends upon several factors, principally on the fineness of the mixture, proper application and distribution of heat thereto or therein, and the porosity of the mixture, as well as upon other factors. In a general way I may state here that with the conditions as specified above, the formation of $AlCl_3$ will proceed simply at a dull red heat of the mixture until all the aluminum oxid is converted into $AlCl_3$.

In order to make the $AlCl_3$ still more non-hygroscopic, I may inject a suitable water-repelling substance such as carbon tetrachlorid or petroleum oil vapors in the cooling chambers where the $AlCl_3$ is collected. I have found that the introduction of such vapors prevents caking of the $AlCl_3$; these vapors seem to form a film between the particles of the $AlCl_3$ and thus prevent adhesion and caking.

What I claim as new is:

1. The method of manufacturing aluminum chlorid, which comprises subjecting an aluminum compound or ore to the action of carbon bisulfid and chlorin gases at a temperature sufficient to produce reactions causing aluminum chlorid to be given off.

2. The method of manufacturing aluminum chlorid, which comprises providing a finely divided mixture containing aluminum oxid and a constituent to make the mixture more porous and subjecting the same to the action of carbon bisulfid and chlorin gas at a temperature sufficient to produce reactions causing aluminum chlorid to be given off.

3. The method of manufacturing aluminum chlorid, which comprises providing a finely divided mixture containing aluminum oxid together with a suitable fuel, burning the fuel so as to render the mass porous, and then subjecting the same to the action of carbon bisulfid and chlorin gas at a temperature sufficient to produce reactions which cause the mass to give off aluminum chlorid.

4. The method of manufacturing aluminum chlorid which comprises subjecting a mixture of aluminum and calcium oxid to the action of carbon bisulfid and chlorin gases and to heat sufficient to produce reactions which cause the mixture to give off aluminum chlorid.

5. The method of manufacturing aluminum chlorid which comprises providing a finely divided mixture containing aluminum and calcium oxids and also a constituent to make the mixture more porous and subjecting the same to the action of carbon bisulfid and chlorin gases to sufficient heat to produce reactions which cause the mixture to give off aluminum chlorid.

6. The method of manufacturing aluminum chlorid which comprises making a mixture of finely divided dry aluminum oxid or ore and calcium oxid together with a suitable fuel, burning the fuel in the mixture to make the same porous, and subjecting the mass to sufficient heat and to the action of carbon bisulfid and chlorin gases to produce reactions which will cause the mixture to give off aluminum chlorid.

7. The method of manufacturing aluminum chlorid and calcium sulfate which comprises subjecting the mixture of substantially pure oxids of aluminum and calcium to the action of carbon bisulfid and chlorin gases and to heat sufficient to produce reactions in the mixture and cause it to give off aluminum chlorid, and recovering calcium sulfate as residue.

8. The method of manufacturing aluminum chlorid which comprises making a mixture of aluminum and calcium oxids into bricks with a combustible binding material, burning off the binding material, and subjecting the resulting porous mass to sufficient heat and to the action of carbon bisulfid and chlorin gases to produce reactions which will cause the mixture to give off aluminum chlorid.

JOHN R. MARDICK.